US011938902B2

(12) United States Patent
Hartmann et al.

(10) Patent No.: US 11,938,902 B2
(45) Date of Patent: Mar. 26, 2024

(54) SLIDING CENTER CONSOLE

(71) Applicant: Brose Fahrzeugteile SE & Co. Kommanditgesellschaft, Coburg, Coburg (DE)

(72) Inventors: Ulf Hartmann, Lake Orion, MI (US); James Elsarelli, Leonard, MI (US); Michael Kidd, Oxford, MI (US); Andrew Lakerdas, London (CA); Raymond Weir, Oxford, MI (US); Sarah Miller, Fenton, MI (US); Robert Neundorf, Ebersdorf (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 583 days.

(21) Appl. No.: 17/267,072

(22) PCT Filed: Aug. 23, 2018

(86) PCT No.: PCT/US2018/047688
§ 371 (c)(1),
(2) Date: Feb. 9, 2021

(87) PCT Pub. No.: WO2020/040767
PCT Pub. Date: Feb. 27, 2020

(65) Prior Publication Data
US 2021/0309156 A1    Oct. 7, 2021

(51) Int. Cl.
B60R 7/04     (2006.01)
B60N 2/75    (2018.01)
(Continued)

(52) U.S. Cl.
CPC ............... *B60R 7/04* (2013.01); *B60N 2/793* (2018.02); *B60R 11/00* (2013.01); *F16H 19/043* (2013.01)

(58) Field of Classification Search
CPC ... B60R 7/04; B60R 11/00; B60R 2011/0007; F16H 19/04; F16H 55/28; F16H 57/12;
(Continued)

(56) References Cited

U.S. PATENT DOCUMENTS 6,752,444 B2    6/2004    Kitano et al.
7,530,615 B2    5/2009    Ogura
(Continued)

FOREIGN PATENT DOCUMENTS

CN    204956343 U    1/2016
DE    10334999 A1    2/2005
(Continued)

OTHER PUBLICATIONS

JP-2006248387-A computer translation (Year: 2006).*
(Continued)

*Primary Examiner* — Amy R Weisberg
*Assistant Examiner* — Melissa Ann Bonifazi
(74) *Attorney, Agent, or Firm* — Dickinson Wright PLLC

(57) ABSTRACT

A sliding vehicle center console is provided. The center console may include an elongated rack, including an elongated rack, defining a plurality of teeth, a carrier member coupled to the rack, and a gearbox assembly including a pinion configured to rotate in a first or a second direction to translate the carrier member and the elongated rack from a first position to a second position. The sliding vehicle center console may also include a controller configured to change the rotation of the pinion from one of the first or second directions to the other directions, responsive to a comparison of a sensor value to a threshold condition.

21 Claims, 8 Drawing Sheets

(51) Int. Cl.
  *B60R 11/00*    (2006.01)
  *F16H 19/04*    (2006.01)
(58) Field of Classification Search
  CPC ............. F16H 57/031; F16H 2057/126; F16H 19/043; F16H 2019/046; B60N 2/02246; B60N 2/793
  See application file for complete search history.

(56) References Cited

U.S. PATENT DOCUMENTS

| | | |
|---|---|---|
| 7,591,498 B2 | 9/2009 | Busha et al. |
| 2004/0103731 A1 | 6/2004 | Minowa et al. |
| 2008/0093873 A1 | 4/2008 | Ogura |
| 2010/0156129 A1 | 6/2010 | Evans et al. |
| 2019/0315281 A1* | 10/2019 | Lee .......................... B60R 7/04 |

FOREIGN PATENT DOCUMENTS

| | | | |
|---|---|---|---|
| JP | 2006248387 A | * | 9/2006 |
| JP | 2006248387 A | | 9/2006 |
| KR | 20120059275 A | | 6/2012 |
| KR | 20180042633 A | | 4/2018 |

OTHER PUBLICATIONS

Chinese Office Action for CN 201880096802.3, English Translation attached to original, dated Mar. 31, 2023, All together 21 Pages.
Chinese Office Action for CN 201880096802.3, English Translation attached to original dated Oct. 11, 2023, All together 13 Pages.

* cited by examiner

SLIDING CENTER CONSOLE

CROSS-REFERENCE TO RELATED APPLICATIONS

This application is the U.S. National Phase of PCT Application No. PCT/US2018/047688 filed on Aug. 23, 2018, the disclosure of which is hereby incorporated in its entirety by reference herein.

TECHNICAL FIELD

The present disclosure relates to interior storage compartments for vehicles. More specifically, the disclosure relates to a movable center console.

BACKGROUND

Larger vehicles, such as sport utility vehicles or vans may include first, second, and third rows of seats within the vehicle cabin. The various rows of seats may be bench seats, one continuous seat, or two individual seats that are spaced apart from one another. Generally, the two seats of the first row or the front row of seats are disposed on either side of a center console assembly. A fixed center console between two individual seats in the second row would block ingress to the third row of seats from the vehicle cabin.

Center consoles serve several purposes such as providing storage and housing climate controls and entertainment features.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a sliding center console frame assembly for a vehicle having a floor including a mounting member. The sliding center console frame assembly also includes an elongated rack defining a plurality of teeth. The sliding center console frame assembly also includes a carrier member coupled to the rack. The sliding center console frame assembly also includes a gearbox assembly fixed to the mounting member including a pinion configured to rotate in a first or second direction to translate the carrier member and the elongated rack from a first position to a second position. Other embodiments of this aspect include corresponding computer systems, apparatus, and computer programs recorded on one or more computer storage devices, each configured to perform one or more of the actions set forth above.

One general aspect includes a sliding center console frame assembly for use in a vehicle having a floor and configured to support a fixed portion of a center console assembly and a moving portion of a center console assembly that includes an armrest, and a second storage area, the sliding center console frame assembly including a base member attachable to the floor. The sliding center console frame assembly also includes a carrier member for supporting the moving portion. The sliding center console frame assembly also includes an elongated rack, defining a plurality of teeth, coupled to a rack attachment bracket. The sliding center console frame assembly also includes a gearbox assembly fixed to the base member including a pinion configured to rotate in a first or second direction to translate the carrier member and the elongated rack from a first position to a second position. The sliding center console frame assembly also includes a controller configured to change the rotation of the pinion from one of the first or second directions to the other directions, responsive to a comparison of a sensor value to a threshold condition. Other embodiments of this aspect include corresponding computer systems, apparatus, and computer programs recorded on one or more computer storage devices, each configured to perform one or more of the actions set forth above.

One general aspect includes a sliding vehicle center console including an elongated rack, defining a plurality of teeth, a carrier member coupled to the rack, and a gearbox assembly including a pinion configured to rotate in a first or a second direction to translate the carrier member and the elongated rack from a first position to a second position. The sliding vehicle center console may also include a controller configured to change the rotation of the pinion from one of the first or second directions to the other directions, responsive to a comparison of a sensor value to a threshold condition. Other embodiments of this aspect include corresponding computer systems, apparatus, and computer programs recorded on one or more computer storage devices, each configured to perform one or more of the actions set forth above.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Manually moving a center console may require a significant amount of effort and at times, it can be awkward for the user. Using an electro-mechanical mechanism to "power" and move the center console at the press of a button generally resolves these problems, but the mechanism may present other problems. For example, the time required to move the center console must be suitable to meet the expectations of the user. As another example, the center console may be required to detect and avoid a collision between an occupant or another object and the center console, commonly referred to as anti-trap. Moreover, because the center console inherently involves the mechanism and center console being mounted in a suitable way to allow for selective movement, the interface between the mechanism and the center console must be rigid enough to prevent excessive free play and associated noise issues. Each of the embodiments of the present disclosure aims to remedy one or more of the above-mentioned problems.

Figure 1:
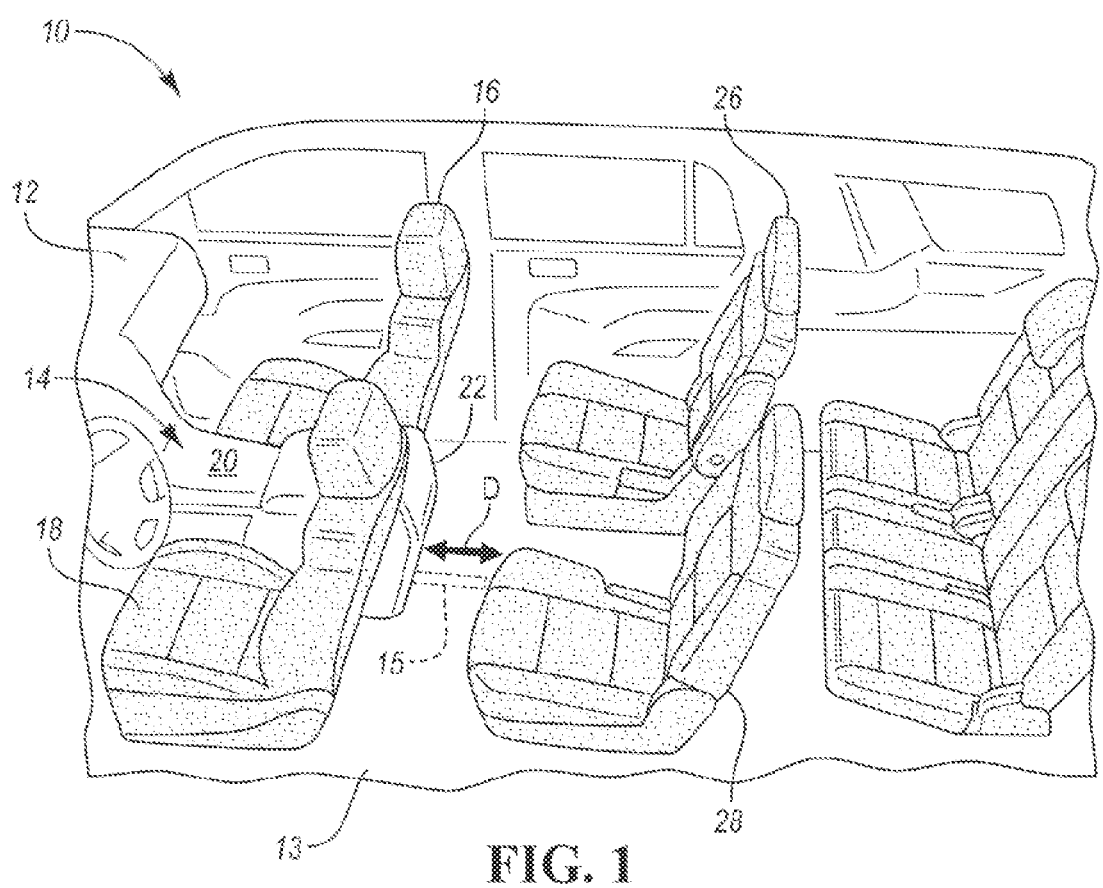
FIG. 1 is an environmental view of a vehicle cabin that includes a moving center console.

FIG. 1 illustrates a vehicle 10 and in particular, a vehicle cabin 12 that includes a vehicle floor 13 and a sliding center console assembly 14 that is attached to the floor 13. In one embodiment, the sliding center console assembly 14 may be coupled to and move along an elongated track 15 formed within the floor 13. Here, sliding center console assembly 14 is disposed in a forward position, between a driver's seat 16 and a passenger seat 18.

The sliding center console assembly may include a fixed center console portion 20 and a sliding or moving portion 22. The moving center console portion 22 may move or slide along the bi-directional arrow D, so that it is positioned between a second-row-driver-side seat 26 and a second-row-passenger-side seat 28.

Figure 2:
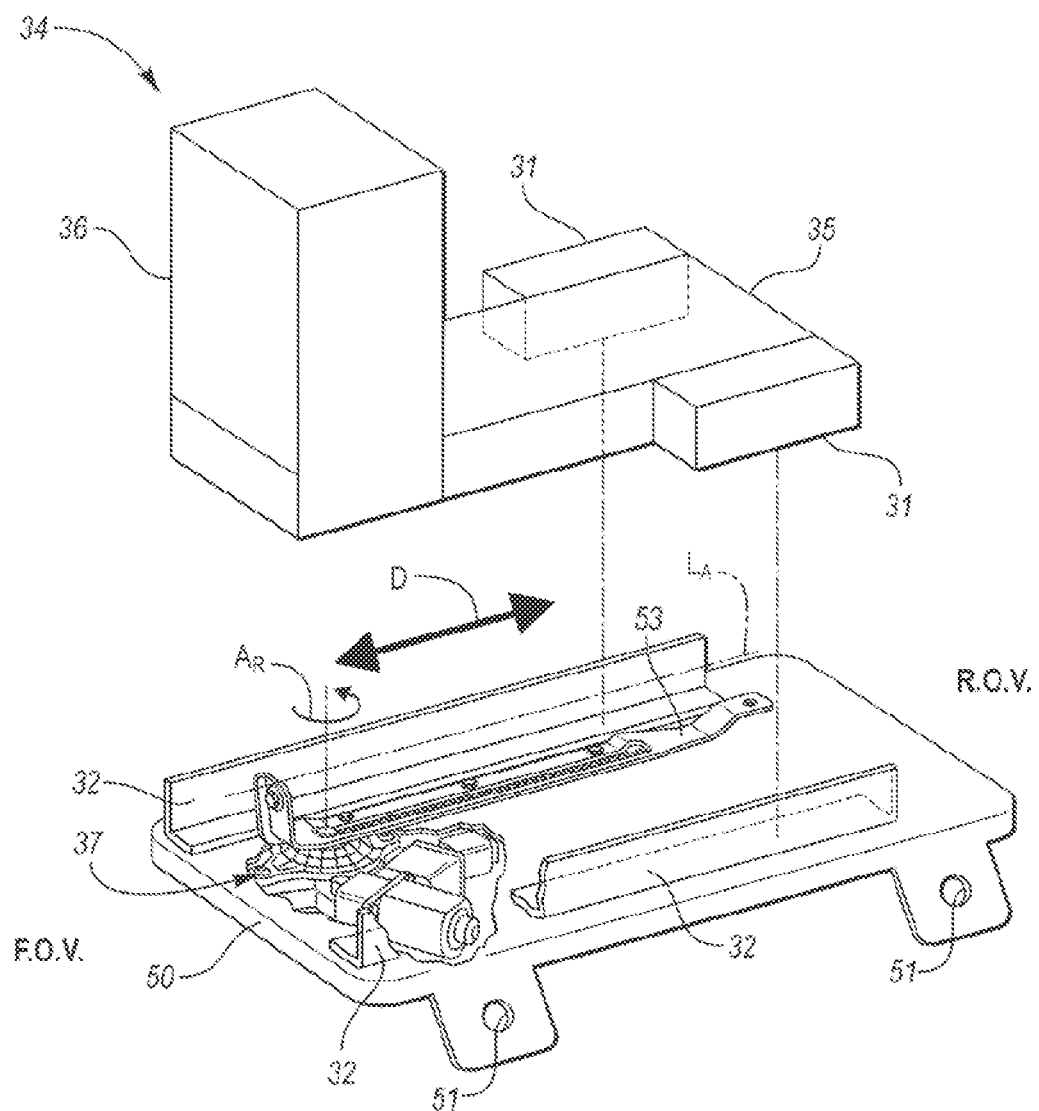
FIG. 2 is a partial-exploded-perspective view of a center console frame assembly of the moving center console.
Figure 3A:
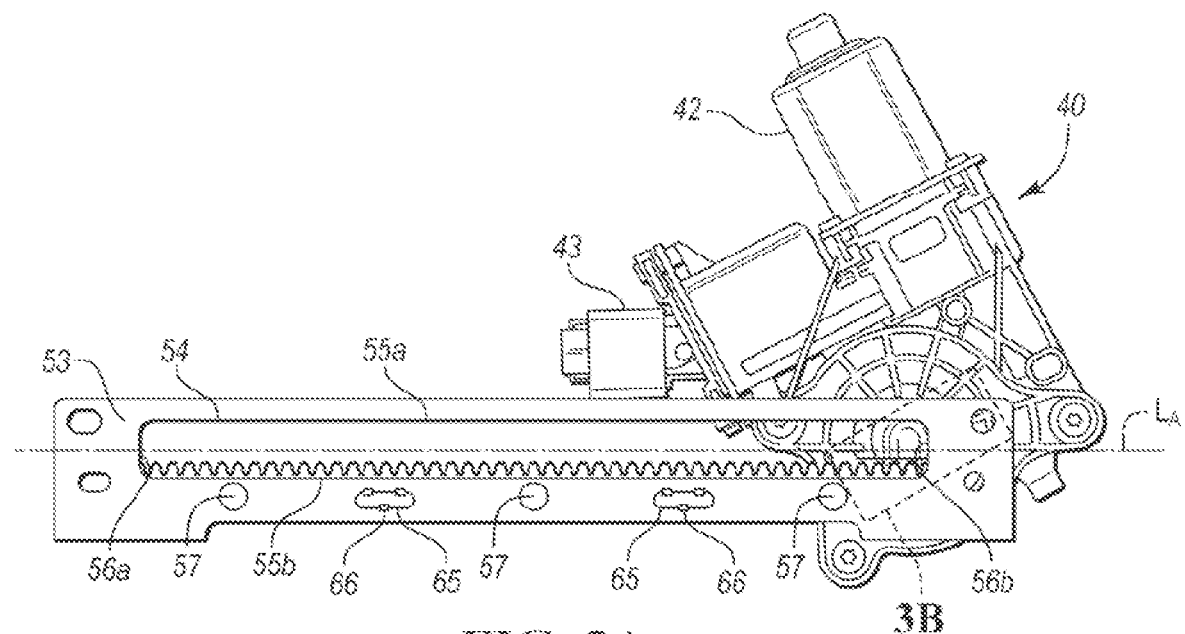
FIG. 3A is a top-view of a mechanism assembly for use with the center console frame assembly of the moving center console.

Referring to FIGS. 2 and 3A, a frame assembly 34 of the sliding center console assembly is provided. For clarity purposes, the orientation of the vehicle with respect to the center console frame assembly 34 is represented by R.O.V. (rear of vehicle) and F.O.V. (front of vehicle). The frame assembly 34 may include a carrier member 36 that is movable along the bi-directional arrow D. The carrier member may include a bottom portion 35 that may include engagement members 31. The engagement members 31 may translate along one or more guides 32 that may be fixed to a base member 50.

In one or more embodiments, the base member 50 may be attached to the vehicle floor 13 (FIG. 1). In at least one embodiment, the center console frame assembly includes a base member 50 that defines attachment holes 51 for attaching it to the vehicle floor 13. The mechanism 37, more specifically the gearbox assembly 40 may be attached to the base member 50. Alternatively, the vehicle floor 13 may include the guides 32.

The carrier member 36 may be moved or translated by a mechanism 37. The mechanism 37 may include an elongated rack member 38 that is coupled, directly or indirectly, to the carrier member 36. In one or more embodiments, the carrier member 36 may be coupled to the elongated rack 38 by a rack attachment bracket 53.

The mechanism 37 may also be provided with a gearbox assembly 40 that includes a pinion 41. The pinion 41 includes pinion teeth 47 that engage teeth 39 defined by the elongated rack member 38, so that rotation of the pinion 41 moves the elongated rack member 38 and the carrier member 36. The pinion 41 may be rotated by powering a motor 42 that drives one or more gears (not illustrated) to transmit rotational movement to the pinion 41. The pinion may rotate about a rotational axis $A_R$ so that the elongated rack 38 and carrier member 36 translates along a longitudinal axis $L_A$.

In one or more embodiments, the pinion 41 may be arranged so that the rotational axis of the pinion $A_R$ is orthogonal or perpendicular to the base member 50 or vehicle floor 13. Alternatively, the pinion 41 may be arranged so that the rotational axis of the pinion $A_R$ is parallel to the base member 50 or vehicle floor 13.

In one or more embodiments, the rack attachment bracket 53 may define an elongated or longitudinal slot 54 that includes a pair of edges 55a and 55b that extend along the longitudinal axis $L_A$ between front edge 56a and rear edge 56b of the slot 54. The rack attachment bracket 53 may be attached to the elongated rack member 38 by fasteners, such as rivets 57.

Figure 3B:
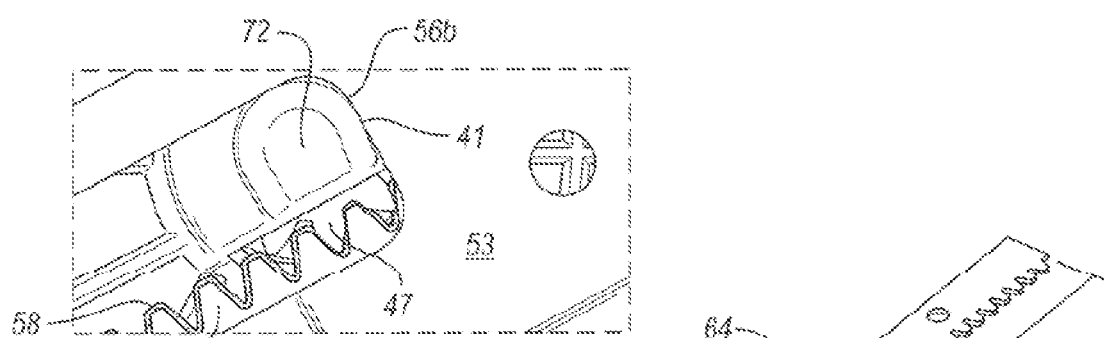
FIG. 3B is a detailed view of a portion of the mechanism in a first position.
Figure 3C:
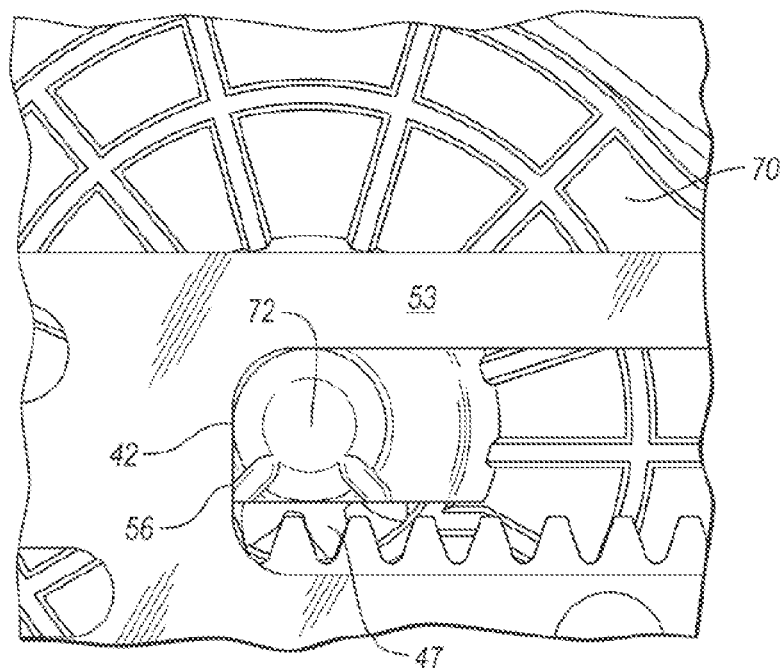
FIG. 3C is a detailed view of a portion of the mechanism in a second position.
Figure 5:
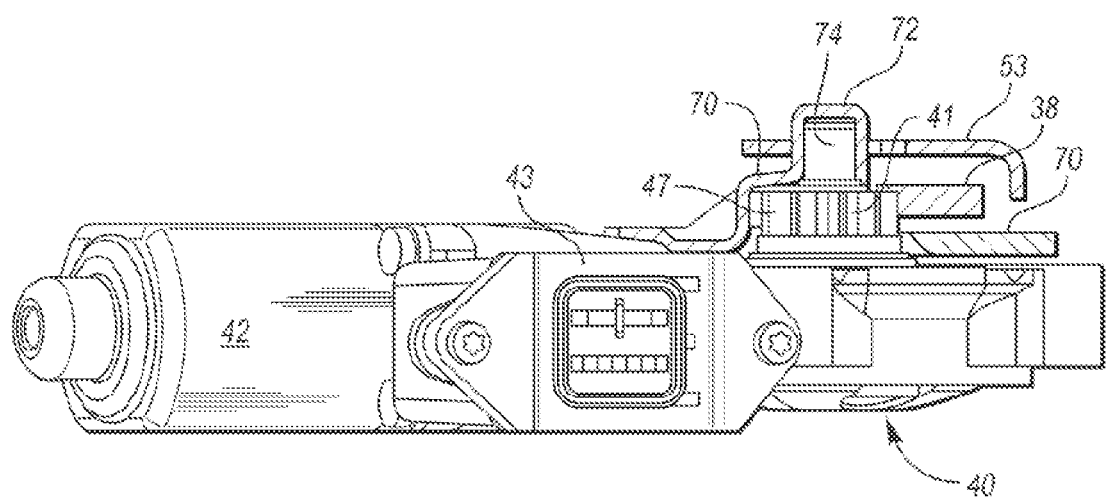
FIG. 5 is a partial-cross-sectional view of a portion of an exemplary gearbox assembly.

Referring to FIGS. 3B and 3C and FIG. 5, the gearbox assembly 40 may include a cover 70 which may include a cap 72. The cap 72 may include a recessed portion or pocket that is seated on a nose 74 of the pinion 41. An outer circumferential surface of the cap 72 may engage one or more edges of the rack attachment bracket 53. For example, when the elongated rack 38 and rack attachment bracket 53 are in a full-forward or full rear position, a portion of the cap 72 may engage the front edge 56a or the rear edge 56b, at points $Y_1$ and $Y_2$ to prevent movement along the longitudinal axis $L_A$. Likewise, a portion of the cap 72 may engage one or more sides, such as 55a, to prevent movement or free play between the elongated rack 38 and pinion teeth 47 of the pinion 41.

The cover 70 including cap 72 may be used in other applications where a gearbox assembly including a pinion 41 is provided, for example, seat adjusters, window regulators, and door latches.

Figure 4:
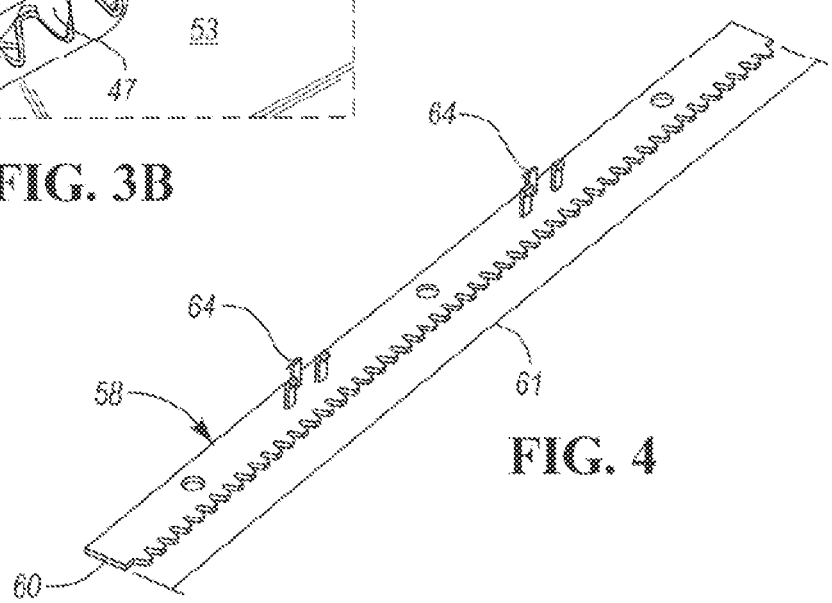
FIG. 4 is a perspective view of an exemplary second elongated rack.

Referring to FIG. 4, a second elongated rack, such as a backlash reduction member 58 may be provided. The backlash reduction member 58 may be coupled to and lie along the elongated rack member 38. The backlash reduction member 58 may include a side 60 that defines another plurality of teeth 61. The plurality of teeth 61 may have a larger profile or cross-sectional area than the teeth 39 of the elongated rack member 38. The teeth 61 of the backlash reduction member 58 may engage a portion of one or more teeth 47 of the pinion 41.

The backlash reduction member 58 may be comprised of a material that is more ductile than the material of the elongated rack member 38. For example, the backlash reduction member 58 may be comprised of a polymeric or rubber material. The backlash reduction member 58 may be configured to deform as the pinion 41 rotates.

The backlash reduction member 58 may include one or more protrusions 64 that extend through apertures or slots 65 that are defined by the elongated rack member 38 or the rack attachment bracket 53. Each of the protrusions 64 may include a retaining flange 66 that engage portions of the elongated rack 38 so that the backlash reduction member 58 is fixed to the elongated rack member 38. In one or more embodiments, the backlash reduction 58 member may be adhered (e.g., glued) to the rack member 38. Alternatively, the backlash reduction member 58 may surround or enclose the elongated rack member 38. For example, the backlash reduction member 58 may be over molded to encapsulate or surround the elongated rack member 38.

In at least one embodiment, the elongated rack member 38 may be comprised of a high strength steel such as SAE 4130 or other suitable materials. Moreover, the elongated rack member 38 may be heat treated so that the steel is case hardened or fully annealed to increase the material's hardness, or strength, or both.

The gearbox assembly 40 may include a controller, such as an electronic control unit ECU 43. The ECU 43 may be configured to detect a pinch or collision condition between an obstacle and one or more portions of the center console 14. The ECU 43 may communicate with a hall sensor, ripple count sensor or other suitable sensor that may be configured to provide a position of the motor with respect to a fixed position (e.g., end stop). Alternatively, the ECU 43 may be configured to detect the true position of the motor 42 with respect to a coordinate system (e.g., cartesian or polar) defined within the vehicle cabin 12.

The ECU 43 may dictate several of the parameters of the motor 42, including but not limited to starting, stopping, decreasing the speed, increasing the speed, and reversing or altering the direction of travel. Additionally, the ECU 43 may monitor several characteristics of the motor, including but not limited to distance traveled, average current draw, and peak current draw. These monitored parameters may be used to determine or detect a pinch condition or collision condition.

Figure 6A:
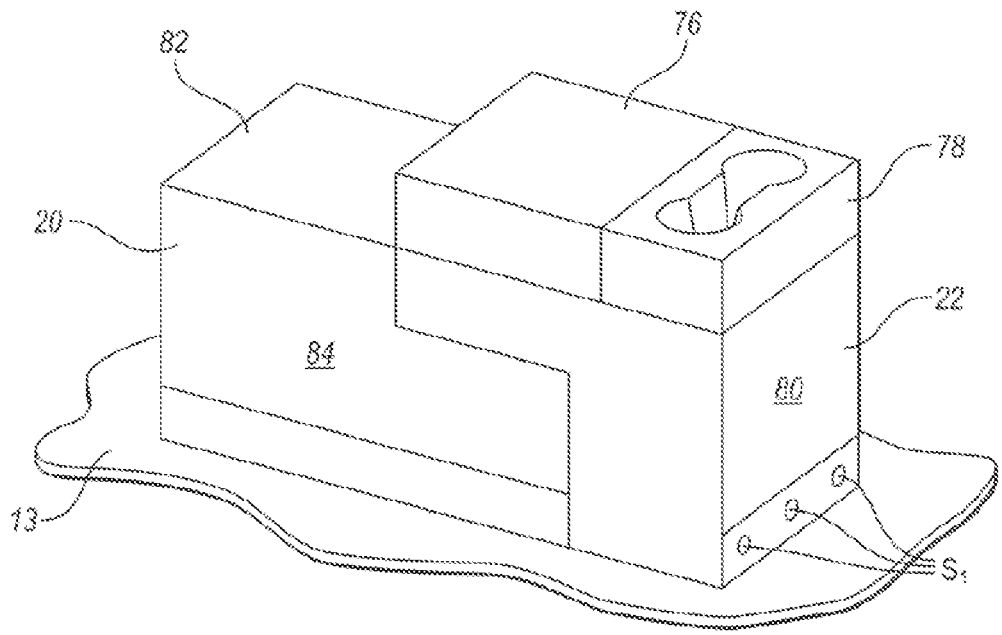
FIG. 6A is a front left perspective view of an exemplary center console assembly in a first position.

FIGS. 6A through 6D are perspective views of the center console assembly 14 according to one or more embodiments. In FIG. 6A, the moving portion 22 of the center console 14 is in a retracted or stowed position. In the retracted or stowed position, the moving portion 22 may be adjacent to and disposed along sidewalls 84 of the fixed portion 20. The sidewalls 84 of the fixed portion 20 may be connected by a top surface 82 of the fixed portion 20. In the retracted or stowed position, the moving portion 22 may be adjacent to and next to the fixed portion 20. The moving portion 22 may include an armrest 76 that may be adjacent to a storage area 78. The moving portion 22 may include a rear face 80 that may be provided with one or more sensors $S_1$. The sensors $S_1$ may be configured to detect an obstacle that is positioned rearward or adjacent to the rear face 80 of the moving portion 22.

Figure 6B:
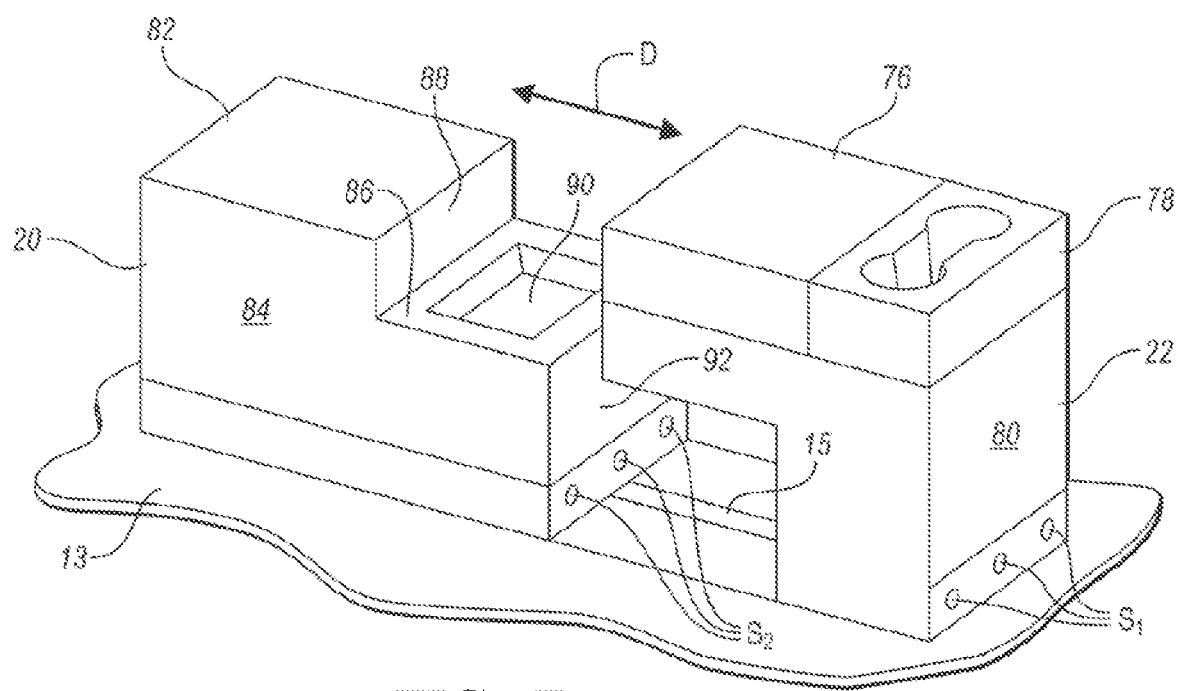
FIG. 6B is a front left perspective view of an exemplary center console assembly in a second position.

In FIG. 6B, the moving portion 22 of the center console 14 is in an extended or deployed position. The moving portion 22 may move along the track 15 defined by the vehicle floor 13 from the retracted or stowed position to the extended or deployed position. In one or more embodiments, the vehicle center console may translate above the floor 13. The fixed portion 20 of the center console assembly 14 may include a second storage area 90 that may be uncovered or accessed when the moving portion 22 is in the retracted or deployed position. The second storage area may be defined by a surface 86 of the fixed portion 20. The fixed portion 20 may include a rear face 92 that may be provided with one or more sensors $S_2$. The sensors may be configured to detect an obstacle positioned between the fixed portion 20 and the moving portion 22.

Figure 6C:
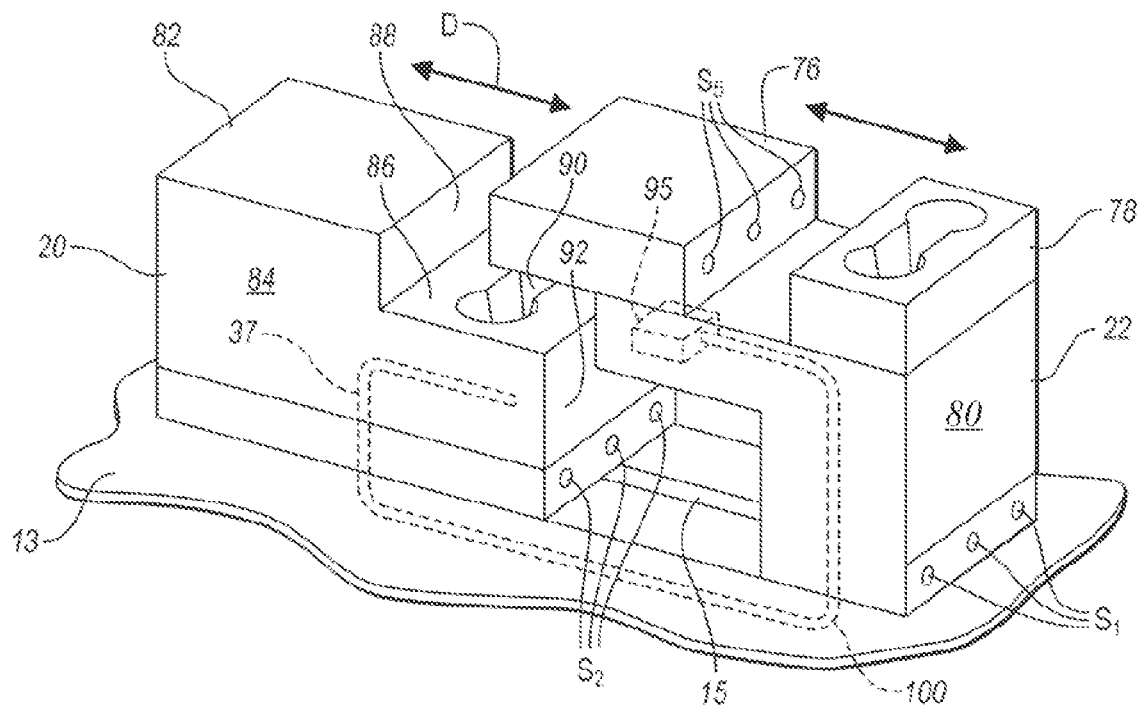
FIG. 6C is a front left perspective view of an exemplary center console assembly in a third position.

In FIG. 6C, the moving portion 22 is in the deployed or extended position. The armrest 76 of the moving portion 22 may move (e.g., slide or translate) away from the storage area 78 of the moving portion 22 towards the fixed portion 20. The armrest 76 may be provided with sensors $S_5$. The sensors $S_5$ may be configured to detect an obstacle positioned between the armrest 76 and the storage area 78 of the moving portion 22. The armrest 76 may be coupled to one or more locking devices 95 (e.g., latch), or actuation device (e.g., motor, gear mechanism), or both. The locking device may facilitate actuation or movement of the armrest 76 with respect to the storage area 78. In one or more embodiments, the locking devices or actuation devices may be operatively connected to the mechanism 37. For example, a cable (e.g., Bowden cable) may be operatively connected to the mechanism such that actuation of the moving portion 22 unlocks or locks the armrest 76 in place.

Figure 6D:
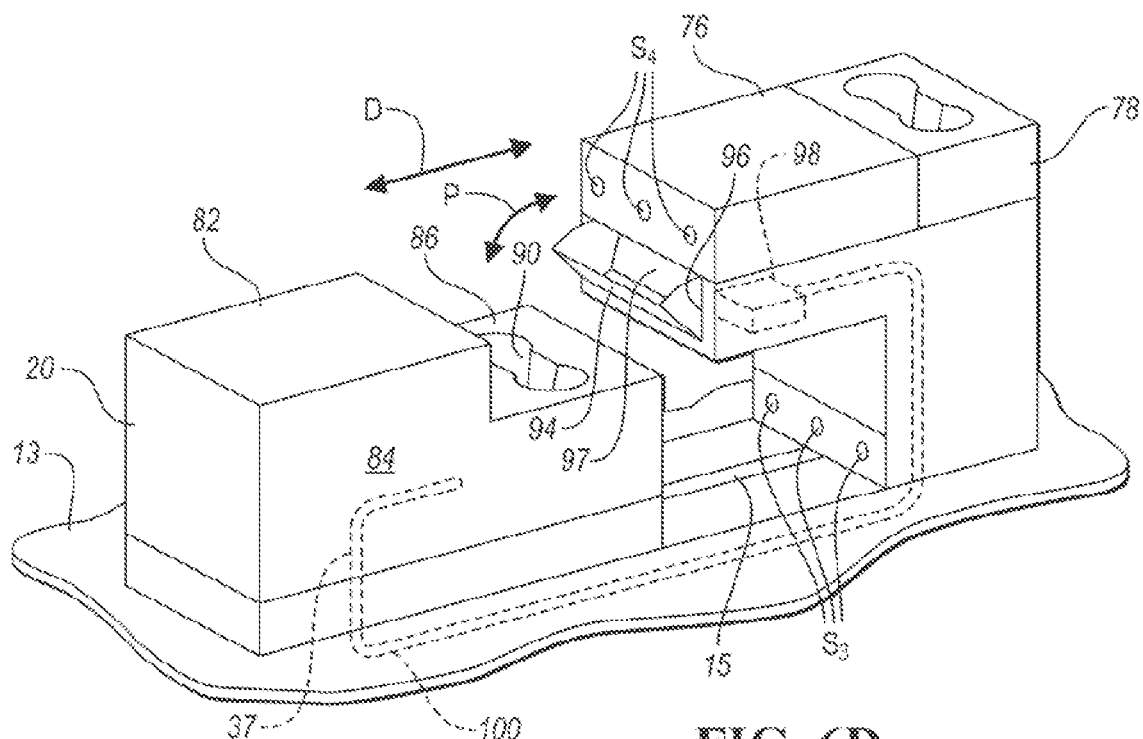
FIG. 6D is a front left perspective view of an exemplary center console assembly in a fourth position.

Referring to FIG. 6D, the moving portion 22 may include a front face 96 that may move adjacent to and lie along a contact surface 88 defined by the fixed portion 20 when the moving portion 20 is in the retracted or stowed position. The front face 96 may include a third storage area 97 that may be accessed or uncovered by actuation of a closure 94. The closure 94 may be actuated by a closure motor and associated mechanism 98. The closure 94 may also be connected to the mechanism 37 by a cable 100. In one or more embodiments, the cable 100 may be a Bowden cable that is configured to move the closure 94 from an open position to a closed position as the moving portion 22 moves to the retracted position. Alternatively, the closure 94 may move from the open position to the closed position when the closure hits the contact the surface 88 as the moving portion 22 moves towards the fixed portion 20. Sensors $S_3$ may be provided on the front face 96 near the elongated track. The sensors $S_3$ may be configured to detect an obstacle, such as an occupant's foot disposed between the fixed portion 20 and the moving portion 22. Sensors $S_4$ may be provided on the front face 96 of the moving portion 22. The sensors $S_4$ may be configured to detect an obstacle disposed between the closure 94 and the front face 96. Alternatively, the sensors $S_4$ may be provided on the closure 94.

Figure 7:
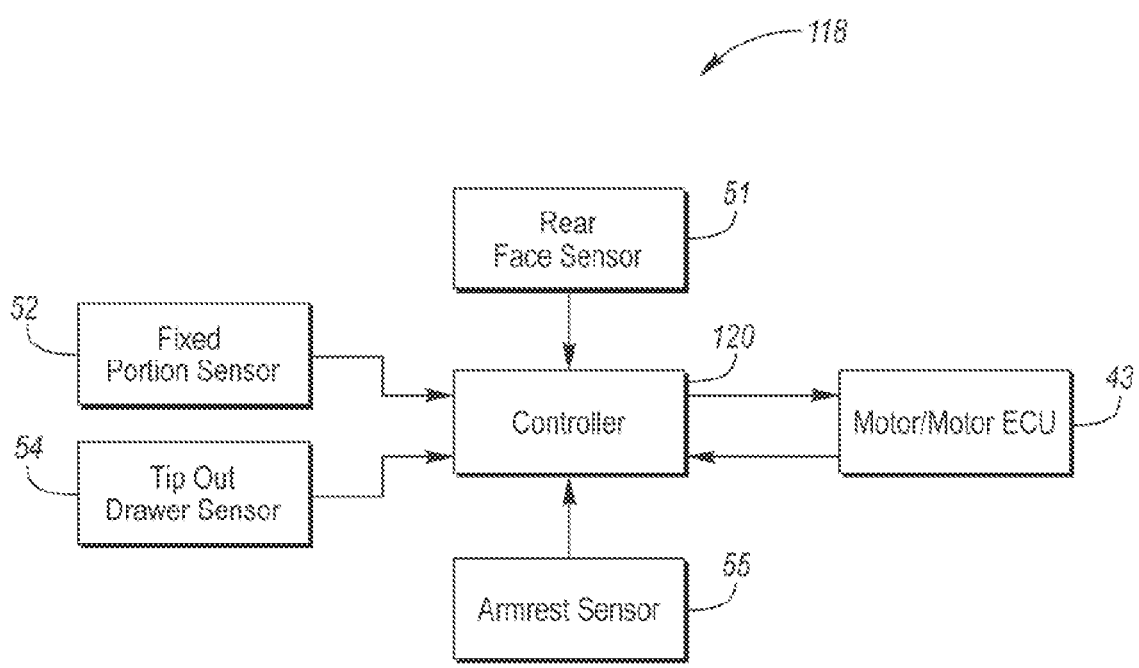
FIG. 7 is a schematic diagram of an exemplary controls system for use with the center console assembly.

Referring to FIG. 7, a schematic diagram illustrating a control system 118 of the center console assembly 14 is provided. The control system may include a controller 120 that may be configured to receive signals from the sensors ($S_1$-$S_5$) and the ECU 43. The sensors S ($S_1$-$S_5$) may include tactile sensors, capacitive sensors, visual sensors, proximity sensors, or a combination thereof. Tactile sensors may be of different types including piezo-resistive, piezoelectric, capacitive, and elasto-resistive sensors. Visual sensors may include cameras or other suitable imaging devices. Proximity sensors may refer to sensors such as radar, LIDAR, magnetic, sonar, etc.

The control system 118 may also include an actuation button 122. The actuation button may provide a signal to the controller 120 that is indicative of a command to actuate the mechanism 37, armrest locking mechanism 95, and closure motor and mechanism 98. For example, the pressing of the actuation button 122 may provide a signal to the controller 120 to command the mechanism 37 to move the moving portion 22 between the stowed and deployed positions.

Figure 8A:
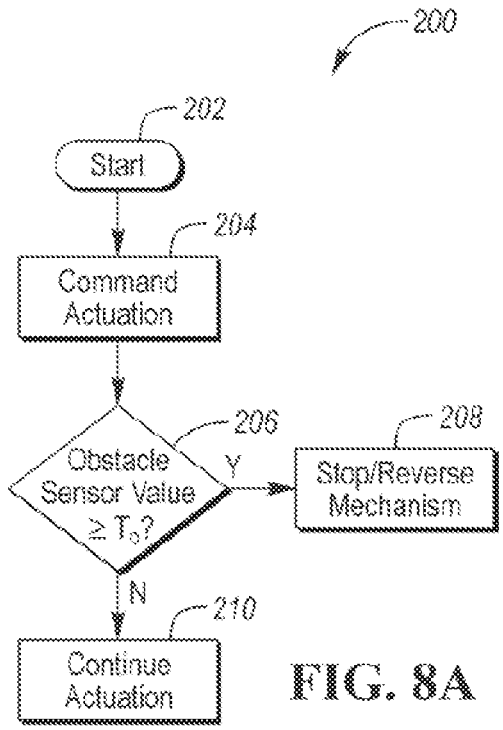
FIGS. 8A through 8D are flowcharts illustrating one or more methods of operating the center console assembly.

Control logic or functions performed by the controller 120 may be represented by flowcharts or similar diagrams, such as the flowchart 200 in FIG. 8A. FIG. 8A provides a representative control strategy and/or logic that may be implemented using one or more processing strategies such as polling, event-driven, interrupt-driven, multi-tasking, multi-threading, and the like. As such, various steps or functions illustrated may be performed in the sequence illustrated, in parallel, or in some cases omitted.

The controller 120 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 120 in controlling the mechanism 37.

Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein but is provided for ease of illustration and description. The control logic may be implemented primarily in software executed by a microprocessor-controlled vehicle 10, ECU 43, or controller 120.

The control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of several known physical devices that utilize electric, magnetic, and/or optical storage to keep executable instructions and associated calibration information, operating variables, and the like.

Referring to FIG. 8A, a flowchart illustrating one or more methods 200 of operating the center console 14 is provided. The method 200 may start 202 by providing a command to the controller 120, or ECU 43, or both actuate, as represented by operation 204. The controller may compare one or more sensor values to a predetermined threshold, such as an obstacle threshold $T_O$, as represented by operation 206. The sensor values may be provided to an ECU 43 by a motor position sensor (e.g., hall, ripple count sensor, or other suitable sensors that may be configured to provide a position of the motor 42 with respect to a known obstacle (e.g., end stop)). In one or more embodiments, sensors ($S_1$-$S_5$) may be tactile sensors, capacitive sensors, visual sensors, proximity sensors, or a combination thereof may provide a measured sensor value to the controller 120. If the measured sensor value is equal to or above the obstacle threshold $T_O$, the controller may stop the rotation of the pinion 41, or reverse the rotational direction of the pinion 41, or both, as in operation 208. If the measured sensor value is below the obstacle threshold $T_O$, the controller may provide a signal to continue the actuation, as represented by operation 210. The terms above and below are for illustrative purposes only and are not meant to be limiting.

Figure 8B:
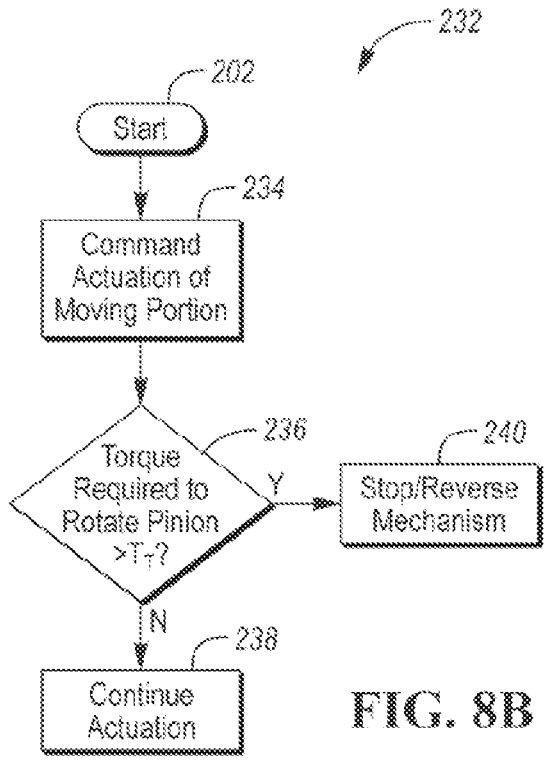

Referring to FIG. 8B, a flowchart illustrating one or more methods 232 of operating the center console 14 is provided. The method 232 may start 202 by providing a command to actuate the moving portion 22 with respect to the fixed portion 20, as in operation 234. The controller may compare an initial torque required value to rotate the pinion 41 to a predetermined threshold, such as a torque threshold $T_T$, as represented by operation 236. In one or more embodiments, the initial torque required value to rotate the pinion 41 may be associated with a load or weight applied to the center console assembly. For example, the greater the load or weight on the moving portion, the greater the initial torque required. If the initial torque required value is equal to or above the torque threshold $T_T$, the controller 120 may stop the rotation of the pinion 41, or reverse the rotational direction of the pinion 41, or both, as in operation 240. If the initial torque required value is below the torque threshold $T_T$, the controller may provide a signal to continue the actuation, as represented by operation 238.

Figure 8C:
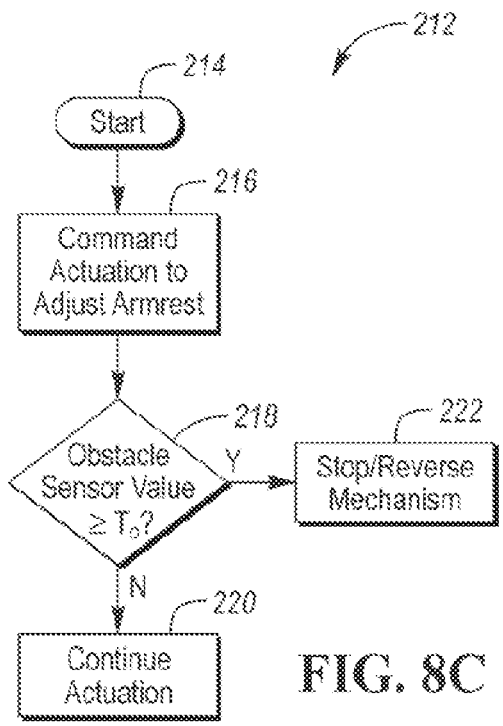

Referring to FIG. 8C, a flowchart illustrating one or more methods 212 of operating the center console 14 is provided. The method 212 may start 202 by providing a command to actuate the armrest 76 of the moving portion 22, as in operation 216. The controller may compare one or more sensor values to a predetermined threshold, such as an obstacle threshold $T_O$, as represented by operation 218. In one or more embodiments, sensors $S_5$ may provide the measured sensor values to the controller 120. If the measured sensor value is equal to or above the obstacle threshold $T_O$, the controller may stop the rotation of the pinion 41, or reverse the rotational direction of the pinion 41, or both, as in operation 222. If the measured sensor value is below the obstacle threshold $T_O$, the controller may provide a signal to continue the actuation, as represented by operation 220.

Figure 8D:
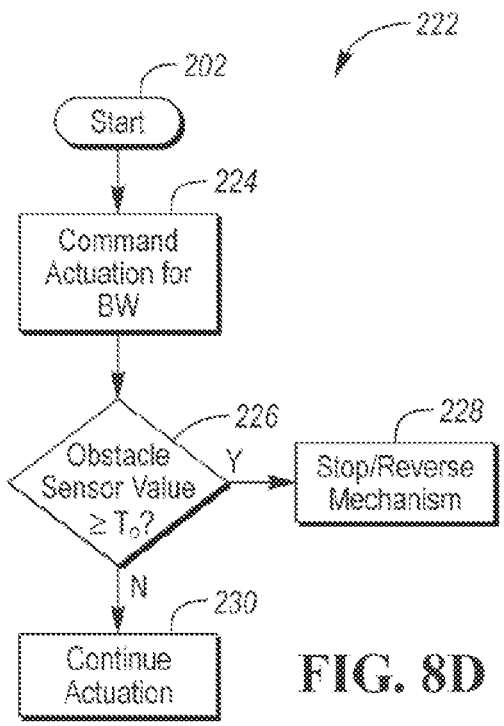

Referring to FIG. 8D, a flowchart illustrating one or more methods 222 of operating the center console 14 is provided. The method 222 may start 202 by providing a command to actuate the storage bin or closure 94, as in operation 224. The controller 120 may compare one or more sensor values to a predetermined threshold, such as an obstacle threshold $T_O$, as represented by operation 226. In one or more embodiments, sensors $S_4$ may provide the measured sensor values to the controller 120. If the measured sensor value is equal to or above the obstacle threshold $T_O$, the controller may stop the rotation of the pinion 41, or reverse the rotational direction of the pinion 41, or both, as in operation 228. If the measured sensor value is below the obstacle threshold $T_O$, the controller 120 may provide a signal to continue the actuation, as represented by operation 230.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sliding center console frame assembly for a vehicle having a floor comprising:
    a mounting member;
    an elongated rack defining a plurality of teeth;
    a carrier member coupled to the rack;
    rack attachment bracket and wherein the rack attachment bracket couples the carrier member to the elongated rack; and
    a gearbox assembly fixed to the mounting member including a pinion configured to rotate in a first or second direction to translate the carrier member and the elongated rack from a first position to a second position, wherein the rack attachment bracket defines a longitudinal slot and wherein a nose defined by the pinion of the gearbox assembly is disposed within the longitudinal slot.

2. The sliding center console of claim 1, wherein the mounting member is the vehicle floor.

3. The sliding center console of claim 1, wherein the carrier member is configured to translate along a longitudinal axis and wherein the pinion of the gearbox assembly defines an axis of rotation and wherein the axis of rotation is transverse to the longitudinal axis.

4. The sliding center console of claim 1, further comprising a second elongated rack defining another plurality of teeth, wherein each of the teeth of the second elongated rack define a cross-sectional area that is greater than a cross-sectional area defined by the plurality of teeth of the elongated rack.

5. The sliding center console of claim 4, wherein the second elongated rack is adhered to the elongated rack.

6. The sliding center console of claim 5, wherein the second elongated rack is comprised of a polymeric material.

7. The sliding center console of claim 6, wherein the second elongated rack is over molded to the elongated rack.

8. The sliding center console of claim 1, wherein the gearbox assembly includes a cover that includes a cap that defines a recessed pocket and surrounds an outer circumferential surface of the nose of the pinion, and wherein an outer circumferential surface of the cap engages an edge defined by the longitudinal slot.

9. A sliding center console frame assembly for use in a vehicle having a floor and configured to support a fixed portion of a center console assembly and a moving portion of a center console assembly that includes an armrest, and a second storage area, the sliding center console frame assembly comprising:
   a base member attachable to the floor;
   a carrier member for supporting the moving portion;
   an elongated rack, defining a plurality of teeth, coupled to a rack attachment bracket;
   a gearbox assembly fixed to the base member including a pinion configured to rotate in a first or second direction to translate the carrier member and the elongated rack from a first position to a second position; and
   a controller configured to change the rotation of the pinion from one of the first or second directions to the other directions, responsive to a comparison of a sensor value to a threshold condition.

10. The sliding center console frame assembly of claim 9, wherein the sensor value is a speed of the gearbox assembly relative the elongated rack, and wherein the threshold condition is a predetermined speed.

11. The sliding center console frame assembly of claim 9, wherein the sensor value is a distance traveled relative to either the first position or the second position, and wherein the controller is further configured to stop rotation of the pinion, responsive to the distance traveled exceeding a predetermined distance threshold.

12. The sliding center console frame assembly of claim 11, wherein the sensor value is a torque required to rotate the pinion and wherein the controller is further configured to cease power to a motor coupled to the gearbox assembly, responsive to the torque required to rotate the pinion exceeding a predetermined torque threshold.

13. The sliding center console frame assembly of claim 12, wherein the torque required to rotate the pinion is associated with a weight applied to the moving portion.

14. A sliding vehicle center console including an elongated rack, defining a plurality of teeth, a carrier member coupled to the rack, and a gearbox assembly including a pinion configured to rotate in a first or a second direction to translate the carrier member and the elongated rack from a first position to a second position, the sliding vehicle center console comprising:
   a controller configured to change the rotation of the pinion from one of the first or second directions to the other directions, responsive to a comparison of a sensor value to a threshold condition.

15. The sliding vehicle center console of claim 14, wherein the sensor value and the threshold condition are each associated with a quantity of light indicative of an obstruction positioned between a closure and a mating surface.

16. The sliding vehicle center console of claim 14, wherein the sensor value and the threshold condition are each associated with a capacitance measured by a sensor disposed within either a fixed portion of the center console and a moving portion of the center console.

17. The sliding center console of claim 16, wherein the moving portion is a storage bin that is configured to move from a stored position, adjacent to and in contact with the fixed portion, and a deployed position and wherein when the storage bin is in the deployed position a portion of the storage bin is spaced apart from the fixed portion.

18. The sliding center console of claim 16, wherein the moving portion is an armrest that is configured to move between a retracted position to an extended position and wherein the fixed portion is a portion of the center console that is adjacent to a portion of the armrest that is adjacent to the fixed portion when the armrest is adjacent to and disposed along the fixed portion.

19. An adjustment mechanism comprising:
   an elongated rack member defining a plurality of teeth;
   attachment bracket defining a slot having an inner edge that is positioned adjacent to the plurality of teeth; and
   a gearbox assembly including,
   a gearset,
   a pinion coupled to the gear set and comprising a plurality of pinion teeth and a nose outwardly extending therefrom, wherein the pinion is configured to rotate in a first direction and a second direction opposite the first to translate the elongated rack, and
   a housing comprising an input cover and an output cover that cooperate to sandwich the gearset and wherein the output cover includes a protrusion outwardly that defines an inner diameter that receives the nose and an outer diameter that engages the inner edge of the slot such that relative movement between the plurality of pinion teeth and the plurality of teeth defined by the elongated rack is mitigated.

20. The sliding center console of claim 1, further comprising:
   a fixed portion fixed to the mounting member;
   a moving portion including a storage bin fixed to the carrier and configured to move from a stored position, adjacent to and in contact with the fixed portion, and a deployed position, in which a portion of the storage bin is spaced apart from the fixed portion.

21. The sliding center console of claim 20, further comprising:
   a sensor fixed to at least one of the fixed portion and the moving portion, and configured to detect an object disposed between the fixed portion and the moving portion; and
   a controller a controller configured to command the gearbox assembly to stop, responsive to a sensor value received form the sensor and indicative of the object disposed between the fixed portion and the moving portion.

* * * * *